Figure 1A:
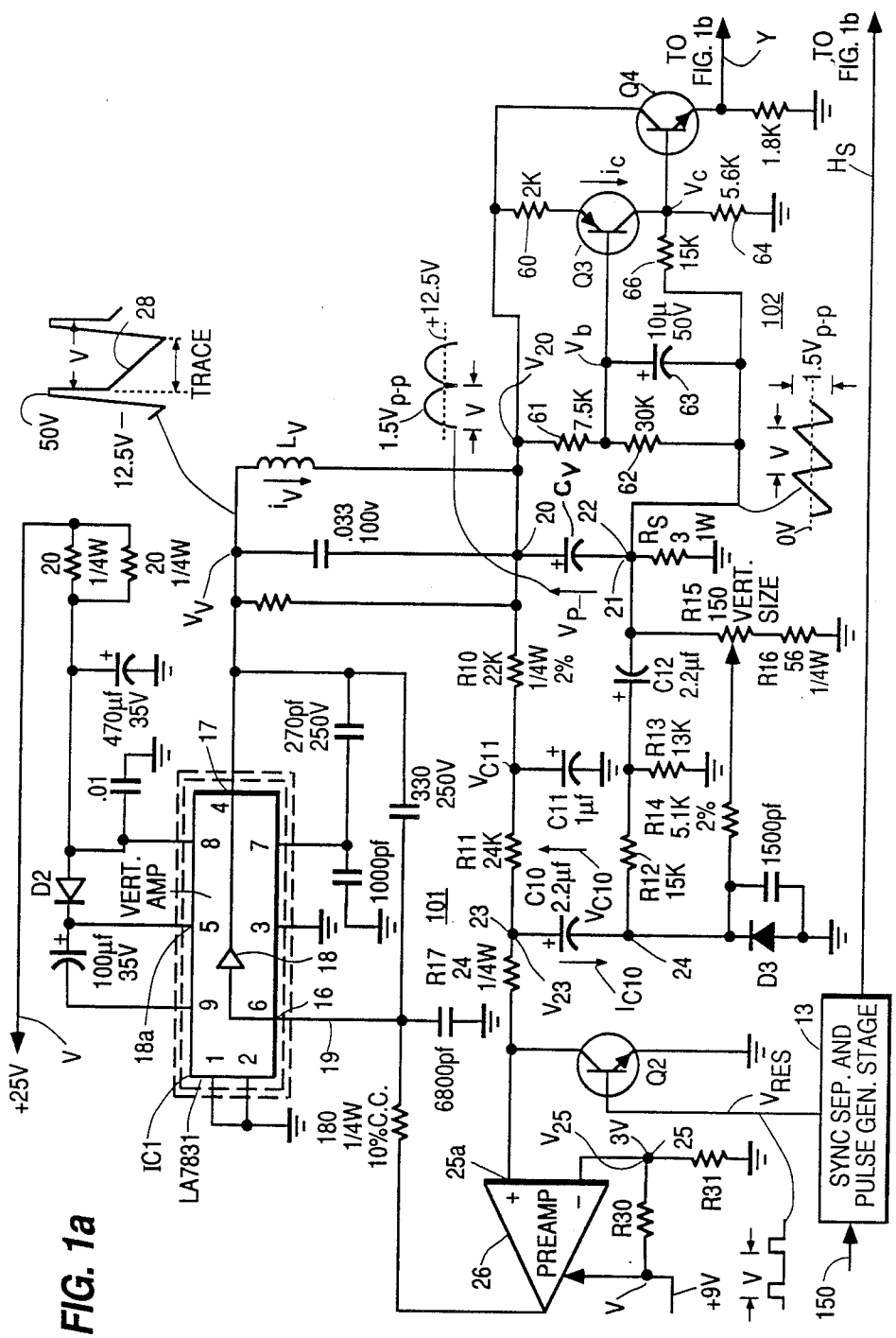
Figure 1B:
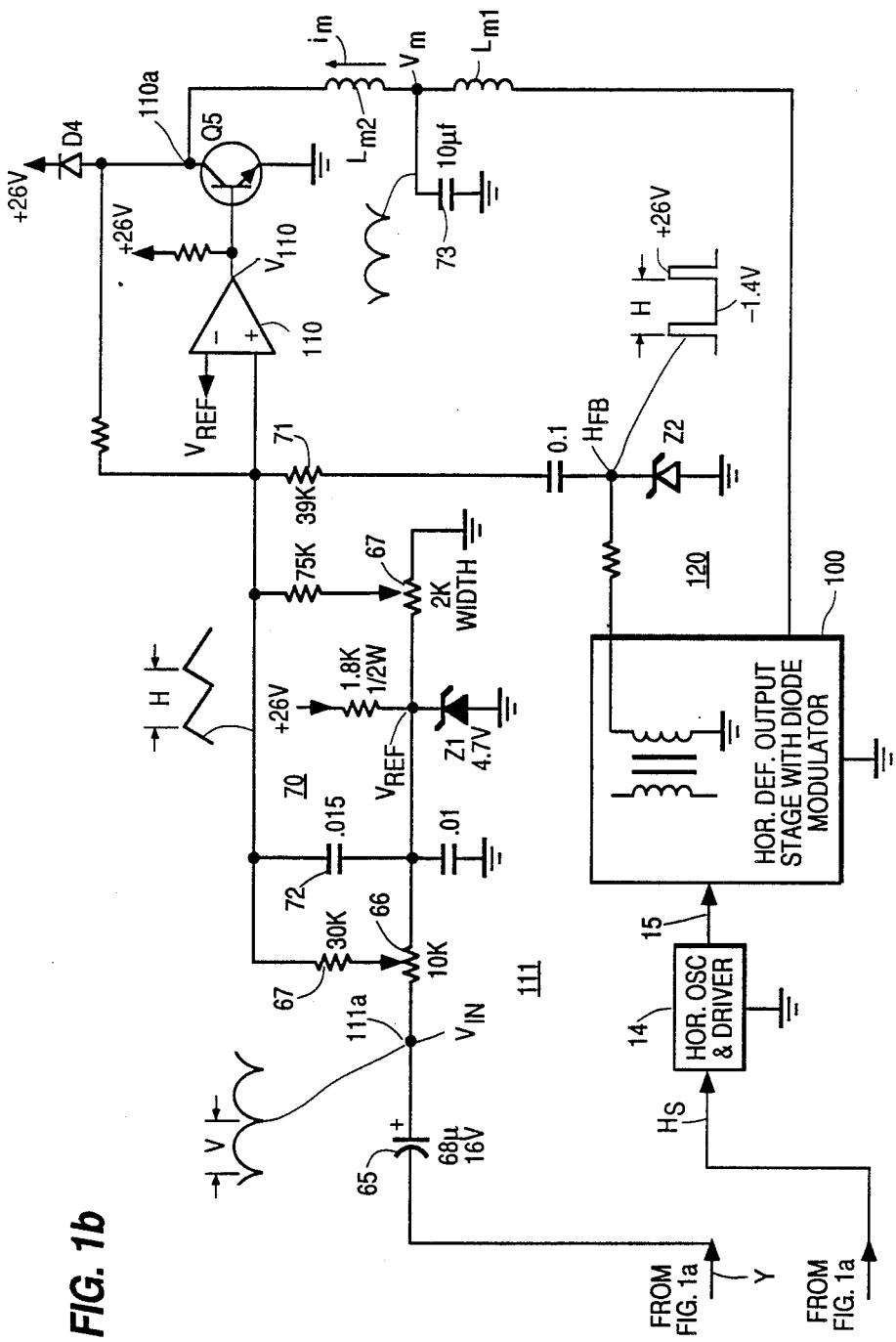

United States Patent [19]

Wilber et al.

[11] Patent Number: 4,965,495
[45] Date of Patent: Oct. 23, 1990

[54] PARABOLIC VOLTAGE GENERATING CIRCUIT

[75] Inventors: James A. Wilber; Lawrence E. Smith, both of Indianapolis, Ind.

[73] Assignee: RCA Licensing Corporation, Princeton, N.J.

[21] Appl. No.: 516,393

[22] Filed: Apr. 30, 1990

[51] Int. Cl.$^5$ .............................................. H01J 29/56
[52] U.S. Cl. ...................................................... 315/371
[58] Field of Search ......................................... 315/371

[56] References Cited

U.S. PATENT DOCUMENTS

| | | | |
|---|---|---|---|
| 4,565,949 | 1/1986 | Haferl | 315/371 |
| 4,687,972 | 8/1987 | Haferl | 315/371 |
| 4,794,307 | 12/1988 | Haferl | 315/371 |
| 4,843,285 | 6/1989 | Chin et al. | 315/371 |

OTHER PUBLICATIONS

A Schematic Diagram of a Portion of a Television Receiver, published by Sambers, Milan, Italy, dated prior to 1985.

Primary Examiner—Theodore M. Blum
Attorney, Agent, or Firm—Joseph S. Tripoli; Joseph J. Laks; Sammy S. Henig

[57] ABSTRACT

A parabolic voltage generating circuit includes an arrangement for generating a sawtooth vertical deflection current that flows in a vertical deflection winding, in a DC blocking capacitor and in a deflection current sampling resistor. An emitter electrode of a transistor is coupled between the deflection winding and the capacitor. A base electrode of the transistor is coupled between the capacitor and the resistance. A collector current of the transistor varies in a vertical rate parabolic manner and has a DC average value that is determined by a DC average value of a voltage that is developed in the capacitor. The collector current is applied to an East-West raster distortion correction circuit for modulating an amplitude of a horizontal deflection current.

20 Claims, 2 Drawing Sheets

PARABOLIC VOLTAGE GENERATING CIRCUIT

The invention relates to a circuit for generating a voltage having a parabolic voltage component at a vertical rate.

In some prior art vertical deflection circuits of, for example, television receivers, a DC blocking capacitor is coupled between a vertical deflection winding and a deflection current sampling resistor. A vertical rate sawtooth deflection current that flows in the capacitor produces a vertical rate parabolic voltage in the capacitor and a sawtooth voltage in the resistor. The resistor is coupled between the capacitor and a common conductor or ground. The sawtooth voltage is used for providing negative feedback in a vertical deflection circuit amplifier. The DC blocking capacitor prevents a DC voltage that is applied to the vertical deflection winding by the vertical deflection circuit amplifier from producing a large DC current in the vertical deflection winding.

In some prior art vertical deflection circuits the parabolic voltage in the capacitor is used for producing a modulating voltage that is referenced to the common conductor. The modulating voltage is used, for example, to modulate an amplitude of a horizontal deflection current in a horizontal deflection winding at a vertical rate parabolic manner for providing East-West raster distortion correction.

In a circuit embodying an aspect of the invention, a transistor is utilized for deriving the modulating voltage from the capacitor voltage such that at least a portion of the sawtooth voltage in the resistor is prevented from affecting the modulating voltage. A DC voltage is developed in the capacitor. In accordance with an inventive feature, the DC voltage in the capacitor is utilized for supplying DC operating voltages between electrodes of the transistor. By utilizing the DC voltage in the capacitor for producing, for example, corresponding DC voltages at an emitter electrode, at a base electrode and at a collector electrode in the transistor, the circuitry associated with the transistor is, advantageously, simplified. Advantageously, a DC collector current in the transistor may be utilized for providing vertical centering.

A video apparatus, embodying an aspect of the invention, for controlling a landing of an electron beam on a display screen of a cathode ray tube, includes a source of an input signal at a vertical rate and a vertical deflection winding disposed on the cathode ray tube. An impedance is provided for generating a deflection current indicative voltage. A capacitor is coupled to the deflection winding and the impedance to form a series arrangement. A vertical deflection amplifier is responsive to the input signal and to the deflection current indicative voltage for generating a vertical deflection current that flows in the series arrangement. First and second voltages are developed at the first and second terminals, respectively, of the capacitor that vary at the vertical rate such that a voltage difference between the first and second terminals varies in a parabolic manner at the vertical rate. A transistor has first, second and third terminals. The first and second terminals of the transistor are coupled across the capacitor. An output signal is generated at the third terminal that varies in the parabolic manner in accordance with the voltage difference. A DC voltage is developed between the terminals of the transistor. The DC voltage is coupled to the transistor via at least one of the deflection winding, the first terminal of the capacitor and the second terminal of the capacitor. The output signal is applied to the cathode ray tube to control the landing of the electron beam in a manner that varies upon vertical deflection.

The sole FIGURE illustrates a parabolic voltage generating circuit, embodying an aspect of the invention.

The sole FIGURE illustrates a modulation voltage generating circuit 102, embodying an aspect of the invention, for generating a voltage $V_{IN}$ containing a vertical rate parabolic voltage component. Voltage $V_{IN}$ is applied to an input terminal 111a of a control stage 111 for generating a voltage $V_m$ that contains a vertical rate parabolic component. Voltage $V_m$ is applied via a modulation inductor $L_{m1}$ to a conventional horizontal deflection circuit 100 that includes a diode modulator for correcting East-West raster distortion correction.

A baseband television signal 150 obtained from a video detector, not shown in the FIGURE, is coupled to a stage 13 that includes a sync separator. The sync separator generates a signal $H_S$ containing a horizontal synchronizing information. Signal $H_S$ is applied to a horizontal oscillator and driver stage 14 that produces a horizontal rate control signal 15 for controlling switching operation in circuit 100 that is synchronized to signal $H_S$.

Control stage 111 includes a resistor 66 coupled between terminal 111a and a reference voltage $V_{REF}$. A wiper of resistor 66 is coupled via a resistor 67 to a noninverting input terminal of a comparator 110. The position of the wiper of resistor 66 is adjusted for controlling an amplitude of parabolic voltage $V_m$. An adjustable resistor 167 is used for generating an adjustable DC voltage that is coupled to the noninverting input terminal of comparator 110 to control vertical raster width.

A horizontal flyback pulse voltage $H_{FB}$ is coupled from flyback transformer T of circuit 100 via a pulse shaper circuit 120 to a resistor 71. Resistor 71 is coupled to the noninverting input terminal of comparator 110. A capacitor 72 that is coupled to the noninverting input terminal of amplifier 110 develops from voltage $H_{FB}$ a horizontal sawtooth voltage at the noninverting input terminal of amplifier 110.

Comparator 110 produces a voltage $V_{110}$ at an output terminal of comparator 110 at the horizontal rate having a pulse width that varies at a vertical rate parabolic manner. Voltage $V_{110}$ is coupled to the base of a switching transistor Q5 that is switched at the horizontal rate. The interval within each horizontal cycle in which transistor Q5 is conductive varies in the vertical rate parabolic manner. The collector of transistor Q5 is coupled via an inductor $L_{m2}$ to a capacitor 73 where East-West modulating voltage $V_m$ is developed. The collector of transistor Q5 is coupled via a diode D4 to a voltage at a magnitude of +26 volts for preventing the collector voltage of transistor Q5 from significantly exceeding +26 volts.

Modulation of the conduction interval of transistor Q5 produces a sink current $i_m$ in inductor $L_{m2}$ that causes voltage $V_m$ to vary at the vertical rate parabolic manner. Voltage $V_m$ provides East-West raster distortion correction in a well known manner.

A vertical deflection circuit 101 produces a vertical rate parabolic voltage $V_P$ and a sawtooth voltage 22 that are used for generating voltage $V_{IN}$. In circuit 101 that operates as a Miller feedback arrangement, a supply voltage V is applied to a supply voltage receiving terminal 18a of an integrated circuit (IC) ICI, such as the IC LA7831, manufactured by Sanyo Corporation. Integrated Circuit ICI includes a vertical amplifier 18 having a push-pull driver stage. Amplifier 18 is responsive to an input signal 19 produced in a negative feedback loop at an inverting input terminal 16. An output terminal 17 of amplifier 18 is coupled to one end terminal of a vertical deflection winding $L_V$ that conducts a deflection current $i_y$. A second end terminal, a terminal 20, of winding $L_V$ is coupled through a DC blocking capacitor $C_V$ to a deflection current sampling resistor $R_S$ that is coupled to a common potential, referred to herein as ground. During each vertical trace interval trace, sawtooth voltage 22 developed at a terminal 21 across resistor $R_S$ is a downramping voltage that changes in a sawtooth manner and that is indicative of the waveform current $i_y$.

Resistors R10 and R11 that provide a DC feedback in deflection circuit 101 are coupled in series between terminal 20 and between a terminal 23 of a Miller integrating capacitor C10. A capacitor C11 that provides S-correction is coupled between ground and a junction terminal of resistors R10 and R11. A resistor R12 and a capacitor C12 are coupled in series between a second terminal 24 of capacitor C10 and terminal 21 of resistor $R_S$ to provide linearity correction. A resistor R13 is coupled between ground and a junction terminal of resistor R12 and capacitor C12. A diode D3 that provides a fast discharge path for discharging capacitor C10 during vertical retrace is coupled between terminal 24 and a wiper terminal of a resistor R15 to provide vertical size control. Resistor R15 forms with a resistor R16 forms with a resistor R16 a series arrangement that is coupled across resistor $R_S$.

A pulse generator that is included in stage 13 generates vertical rate signal $V_{RES}$, in accordance with the corresponding vertical synchronization pulses of signal 150. A transistor switch Q2 operates at a vertical rate in accordance with vertical rate signal $V_{RES}$. A collector electrode of transistor Q2 is coupled via a resistor R17 to terminal 23 of capacitor C10. The emitter electrode of transistor Q2 if grounded. Resistor R17 controls a discharge rate of capacitor C10 during vertical retrace that is partially discharged when transistor switch Q2 is conductive. A terminal of resistor R17 that is remote from terminal 23 of capacitor C10 is coupled to a noninverting input terminal of a pre-amplifier 26. Preamplifier 26 has an output terminal that is coupled to input terminal 16 of amplifier 18 to complete the negative feedback loop.

As explained in U.S. Pat. No. 4,843,285 in the name of Chin et al., entitled "Vertical Tracking Circuit" that is incorporated by reference herein, the feedback arrangement causes vertical amplifier 18 to generate a downramping portion 28 of a vertical sawtooth voltage $V_y$ having a DC voltage component or average value of, illustratively, +12.5 volts. Voltage $V_y$ produces deflection current $i_y$ that flows in winding $L_y$. Vertical current $i_y$ develops corresponding sawtooth voltage 22 across resistor $R_S$ that is a downramping voltage. Vertical current $i_y$ also develops vertical rate parabolic voltage $V_P$ across capacitor $C_V$, in a well known manner. Parabolic voltage $V_P$ is referenced to terminal 21 where sawtooth voltage 22 is developed. The DC average value of voltage $V_P$ that may be, for example, 12.5 volts is produced from the DC voltage component of voltage $V_y$. Terminal 20, that is coupled between capacitor $C_V$ and winding $L_V$, is coupled via an emitter resistor 60 to an emitter electrode of a PNP transistor Q3 operating in a common emitter amplifier configuration.

In accordance with an aspect of the invention, a voltage $V_{20}$ that is developed at terminal 20 containing a DC voltage component is DC-coupled to the emitter of transistor Q3. Voltage $V_{20}$ is also coupled via a DC voltage divider that includes a resistor 61 and a resistor 62 to the base electrode of transistor Q3. Resistor 61 is coupled between the base of transistor Q3 and terminal 20. Terminal 21 is coupled between capacitor $C_V$ and resistor $R_S$. Resistor 62 is coupled between the base of transistor Q3 and terminal 21. The collector electrode of transistor Q3 is coupled to ground via a load resistor 64.

In accordance with another aspect of the invention, resistors 61 and 62 determine a magnitude of a DC voltage that is developed at the base of transistor Q3 that is derived from voltage $V_{20}$. The base electrode voltage is selected such that a collector voltage $V_C$ is maintained less positive than the base voltage, as required for a linear operation of a PNP transistor.

A capacitor 63 having an impedance that is small relative to resistor 61 at the vertical rate is coupled in parallel with the resistor 62. Advantageously, the entire AC parabolic component of voltage $V_P$ is substantially developed across emitter resistor 60, between the emitter of transistor Q3 and terminal 20. An AC vertical rate parabolic component of voltage $V_P$ produces a vertical rate parabolic component of a collector current $i_c$ in transistor Q3 that develops an amplified parabolic voltage component of voltage $V_C$ across collector load resistor 64.

Voltage $V_P$ is developed between terminals 20 and 21. Sawtooth voltage 22 is developed between terminal 21 and ground. A voltage change between terminals 20 and 21 that occurs at a vertical rate parabolic manner produces a current change in collector current $i_c$ at a vertical rate parabolic manner. On the other hand, a voltage change at terminal 21 that occurs at a vertical rate sawtooth manner does not produce any change in current $i_c$. Therefore, current $i_c$ is unaffected by sawtooth voltage 22. It follows that a first portion of collector voltage $V_C$ that is produced from current $i_c$ does not contain any sawtooth waveform component. Thus, transistor Q3 generates the first portion of voltage $V_C$ having a parabolic waveform that is derived from voltage $V_P$. Voltage $V_P$ is referenced to terminal 21 where sawtooth voltage 22 is developed. In contrast, the first portion of voltage $V_C$ is, advantageously, referenced to ground and does not contain any sawtooth voltage component.

A resistor 166 that is coupled from terminal 21 to the collector of transistor Q3 provides trapezoidal distortion correction by combining sawtooth voltage 22 with the first portion of voltage $V_C$ that is parabolic current component of collector current $i_c$ of transistor Q3. In this way, a second portion of voltage $V_C$ that varies in a sawtooth manner is produced.

Because resistors 61 and 62 are coupled to the base of transistor Q3 that forms a high input impedance, values of resistors 61 and 62 can be relatively large. Therefore, advantageously, capacitor 63 that bypasses resistor 62 can have a relatively low capacitance. Using capacitor 63 with low capacitance reduces the cost of capacitor 63.

Transistor Q3 derives its emitter, base and collector DC voltages from the DC average voltage of voltage $V_{20}$ at terminal 20. Advantageously, such arrangement simplifies the circuitry that is required for producing voltage $V_C$ from voltage $V_P$.

Collector voltage $V_C$ of transistor Q3 is coupled via a transistor Q4, operating as an emitter follower, and via a DC blocking capacitor 65 to terminal 111a where vertical rate voltage $V_{IN}$ is generated. As a result, voltage $V_{IN}$ contains a significant vertical rate parabolic component portion that is required for East-West pincushion distortion correction. The collector of transistor Q4 is coupled to terminal 20. A DC current flows through winding $L_V$ and through the collectors of transistors Q3 and Q4.

In accordance with another inventive feature, the DC collector current through transistors Q3 and Q4 is used for providing vertical centering. Vertical centering may be required when, for example, the vertical retrace time is maintained short.

What is claimed is:

1. A video apparatus for controlling a landing of an electron beam on a display screen of a cathode ray tube, comprising:
   a source of an input signal at a vertical rate;
   a vertical deflection winding disposed on said cathode ray tube;
   an impedance for generating thereacross a deflection current indicative voltage;
   a capacitor coupled in series with said deflection winding and with said impedance to form a series arrangement;
   a vertical deflection amplifier responsive to said input signal and to said deflection current indicative voltage and coupled to said series arrangement for generating a vertical deflection current that flows in said series arrangement and develops first and second voltages at first and second terminals, respectively, of said capacitor that vary at said vertical rate such that a voltage difference between said first and second terminals varies in a parabolic manner at said vertical rate;
   a transistor having first and second terminals that are coupled across said capacitor for generating at a third terminal of said transistor an output signal that is determined in accordance with said voltage difference;
   means for developing an energizing, DC voltage between a pair of said terminals of said transistor that is coupled to said transistor via at least one of said deflection winding, said first terminal of said capacitor and said second terminal of said capacitor; and
   means responsive to said output signal for applying said output signal to said cathode ray tube to control said landing of said electron beam in a manner that varies upon vertical deflection.

2. An apparatus according to claim 1 wherein said impedance comprises a deflection current sampling resistance.

3. An apparatus according to claim 2 wherein said deflection current flows in said resistance and produces a sawtooth voltage between one of said first and second terminals of said capacitor and a common conductor.

4. An apparatus according to claim 3 wherein a current that flows in said transistor does not contain any current component having a sawtooth waveform.

5. An apparatus according to claim 3 further comprising, means responsive to said sawtooth voltage for combining said sawtooth voltage with said output signal to provide a trapezoidal correction.

6. An apparatus according to claim 1 further comprising, a DC voltage divider having an input terminal that is coupled to said DC voltage developing means and an output terminal that is coupled to said one of said terminals of said transistor.

7. An apparatus according to claim 6 further comprising, a second capacitor coupled between one of said first and second terminals of the other capacitor and one of said first and second terminals of said transistor for AC-coupling said voltage difference to said transistor to prevent said voltage divider from significantly attenuating an AC component of said voltage difference.

8. An apparatus according to claim 1 wherein at least a substantial portion of said deflection current flows in each of said capacitor and in said impedance.

9. An apparatus according to claim 1 wherein said transistor conducts a DC current that flows in said deflection winding to provide vertical centering.

10. An apparatus according to claim 1 wherein said first terminal of said transistor is coupled between said capacitor and said deflection winding and said second terminal of said transistor is coupled between said capacitor and said impedance.

11. An apparatus according to claim 1 wherein said electron beam landing control means comprises an East-West raster distortion correction circuit for providing East-West raster distortion correction in accordance with said output signal.

12. An apparatus according to claim 1 wherein a given amplitude of said voltage difference produces a larger amplitude of said output signal than produced in said output signal by the same given magnitude of said second voltage.

13. An apparatus according to claim 1 wherein said transistor operates in a common emitter amplifier configuration.

14. An apparatus according to claim 1 wherein an amplitude of said output signal is affected more by said voltage difference than by each of said first and second voltages, alone.

15. An apparatus according to claim 14 wherein said first voltage is a sawtooth voltage.

16. A video apparatus for controlling a landing of an electron beam on a display screen of a cathode ray tube, comprising:
    a source of an input signal at a vertical rate;
    a vertical deflection winding disposed on said cathode ray tube;
    an impedance for generating therein a sawtooth voltage;
    a capacitor coupled between said deflection winding and said impedance to form a current path for a vertical deflection current such that a first junction terminal is coupled between said capacitor and said deflection winding and a second junction terminal is coupled between said capacitor and said impedance;
    a vertical deflection amplifier responsive to said input signal and to said sawtooth voltage for generating said vertical deflection current;
    a transistor having a first main current conducting terminal that is coupled to said first junction terminal and a control terminal that is coupled to said second junction terminal for generating at a third main current conducting terminal of said transistor an output signal that varies in a parabolic manner at said vertical rate in accordance with a voltage difference between said first junction terminal and said second junction terminal;

means for producing a DC voltage that is coupled via said deflection winding to said transistor; and means responsive to said output signal for applying said output signal to said cathode ray tube to control said landing of said electron beam in a manner that varies upon vertical deflection.

17. A video apparatus for controlling a landing of an electron beam on a display screen of a cathode ray tube, comprising:

a source of an input signal at a vertical rate;

a vertical deflection winding disposed on said cathode ray tube;

a capacitor coupled to said deflection winding to form a series arrangement with said deflection winding;

a vertical deflection amplifier responsive to said input signal for generating a vertical deflection current in said series arrangement to develop first and second vertical rate voltages at first and second terminals of said capacitor, respectively, such that the voltage at one of said terminals of said capacitor contains a DC voltage component;

a transistor having first and second input terminals that are coupled to said first and second terminals of said capacitor, respectively, for developing at an output terminal of said transistor an output signal that varies in a vertical rate parabolic manner in accordance with a voltage difference between said first and second terminals of said capacitor such that said DC voltage component is DC-coupled to said first input terminal of said transistor; and means responsive to said output signal for applying said output signal to said cathode ray tube to control said landing of said electron beam in a manner that varies upon vertical deflection.

18. A video apparatus according to claim 17 further comprising, an impedance coupled in series with said capacitor and included in said series arrangement such that said capacitor is interposed between said deflection winding and said impedance and wherein said DC voltage component is developed at one of said terminals of said capacitor that is remote from said impedance.

19. An apparatus according to claim 18 wherein said second input terminal of said transistor is DC-coupled to one of said terminals of said capacitor that is remote from said deflection winding.

20. An apparatus according to claim 17 further comprising, a voltage attenuator for coupling a portion of said DC voltage component to said second input terminal of said transistor and a second capacitor for coupling one of said first and second vertical rate voltages to said second input terminal of said transistor in a manner that bypasses said voltage attenuator.

* * * * *